United States Patent [19]
Itoh

[11] Patent Number: 5,499,053
[45] Date of Patent: Mar. 12, 1996

[54] ELECTRONIC FINDER WITH REDUCED REFLECTION CAUSED BY INCOMING LIGHT

[75] Inventor: Kazumi Itoh, Mitaka, Japan

[73] Assignee: Olympus Optical Co., Ltd., Tokyo, Japan

[21] Appl. No.: 171,621

[22] Filed: Dec. 22, 1993

[30] Foreign Application Priority Data

Dec. 25, 1992 [JP] Japan .................................. 4-346463
Mar. 25, 1993 [JP] Japan .................................. 5-066735

[51] Int. Cl.$^6$ .................................................. H04N 5/225
[52] U.S. Cl. .......................... 348/333; 348/790; 348/795
[58] Field of Search .................................... 348/832, 751, 348/834, 759, 835, 761, 744, 766, 333, 795; 358/230, 231; H04N 5/225, 5/72, 5/74, 5/66

[56] References Cited

U.S. PATENT DOCUMENTS 3,518,373  6/1970  Cushera et al. ........................ 348/834
3,840,695  10/1974  Fischer .
4,239,349  12/1980  Scheffer .

FOREIGN PATENT DOCUMENTS 0003291  1/1985  Japan ..................................... 358/231
1146227  10/1989  Japan .
568189  3/1993  Japan .

Primary Examiner—David E. Harvey
Attorney, Agent, or Firm—Cushman, Darby & Cushman

[57] ABSTRACT

An image observing apparatus capable of reducing reflections caused by incoming light. The apparatus includes an image display such as a liquid crystal cell with at least one optical system disposed between the image display and the observer's eye. A polarizing element is disposed between the optical system and the observer's eye. The apparatus is suited for use with electronic view finders, such as those used with video cameras. Because of the location of the polarizing element, incoming light and incoming light reflected from optical surfaces in the apparatus are decreased in intensity without any attenuation of the light forming the image. Thus, the visibility of the image is improved.

8 Claims, 4 Drawing Sheets

ELECTRONIC FINDER WITH REDUCED REFLECTION CAUSED BY INCOMING LIGHT

BACKGROUND OF THE INVENTION

1. Field of the Invention

This invention relates to an image observing apparatus, such as a finder for video cameras or a still video finder, which is designed to be capable of observing, through an optical system, an image formed by a liquid crystal display or the like.

2. Description of the Related Art

In the image observing apparatus of the type, light enters the apparatus from the outside, reflection of the light makes an image hard to see. For this reason, provision has been made to prevent incoming light from being incident on the apparatus by improving its hood section, or to decrease the reflectance by applying an antireflection film onto its reflecting surface.

Cameras in the field of electronic imaging have used finders on the system of magnifying and viewing the image plane of a cathode-ray tube (CRT) or a liquid crystal display (LCD) through an optical system. Even though provision has been made to decrease the reflectance as mentioned above, the LCD whose image plane is dark as compared with the CRT has the problem that the reflection of incoming light from the surfaces of a finder lens and the LCD cannot be disregarded.

In the system using a shield plate and a hood, such as that proposed by Japanese Utility Model Preliminary Publication No. Hei 1-146227, the shield plate must be made larger in order to effectively prevent incoming light from entering the finder. This burdens the system with the problems of not only making the handling and carrying of a finder apparatus inconvenient, but also giving a disagreeable feeling to an observer. Furthermore, there is another problem that the use of the antireflection film leads to high cost.

SUMMARY OF THE INVENTION

It is, therefore, an object of the present invention to provide an image observing apparatus which is capable of reducing the reflection of incoming light having entered the apparatus, thus improving the visibility of an image.

In order to attain the above object, the image observing apparatus according to the present invention has an image display such as a liquid crystal cell, at least one optical system disposed between the image display and the observer's eye, and a polarizing element disposed between the optical system and the eye.

As the polarizing element, two polarizing elements may be used in such an arrangement that the liquid crystal cell and the optical system are sandwiched therebetween. Three polarizing elements may also be used in such a manner that one of them is interposed between the liquid crystal cell and the optical system. In this case, the first and second polarizing elements from the eye are situated so that their directions of polarization are substantially parallel to each other. The optical system is a single glass lens, and two wave plates producing a phase difference of $(2n+1)\lambda/4$ (where $n=0, 1, 2, 3 \ldots$ and $\lambda$=wavelength of light) may be disposed, one on each side of the display, between the polarizing elements. The two wave plates are arranged so that their orientations of axes are parallel or perpendicular and make an angle of 45° with the polarizing elements. Further, the polarizing element or the image display may be disposed to incline with respect to the optical axis, thereby preventing incoming light, even when reflected from its surface, from entering the observer's eye.

The polarizing element can be disposed, closer to the eye than the display, with a gradient such that an angle $\theta$ made by a normal line drawn to its surface with the optical axis satisfies the condition $$(\theta_1+\theta_2)/2<\theta<85° \quad (1)$$

where $\theta_1$ is an angle of incidence of a light ray entering the end of the image plane from an eyepoint in a plane including the normal line of the polarizing element obliquely disposed and the optical axis, and $\theta_2$ is the minimum of values represented by $\tan^{-1}$ (hp+hl)/l, where P is a point of intersection of the ray entering the end of the image plane with the polarizing element, H is a point of intersection of a perpendicular drawn from the intersection P to the optical axis with the optical axis, hp is a distance between the intersections P and H, and hl is a height from the optical axis to an apparatus frame on the opposite side of the intersection P with respect to the optical axis at a distance l from the intersection H in the range of distance between the intersection H and the eyepoint. In this case, the polarizing element is situated so that its transmission axis lies in a plane including the normal line and the optical axis.

The image display can be disposed with a gradient such that an angle $\theta'$ made by a normal line drawn to its surface with the optical axis satisfies the condition $$(\theta_1'+\theta_2')/2<\theta' \quad (2)$$

where $\theta_1'$ is an angle of incidence of a light ray entering the end of the image plane from an eyepoint in a plane including the normal line of the display obliquely disposed and the optical axis, and $\theta_2'$ is the minimum of values represented by $\tan^{-1}$ (hr+hm)/m, where R is a point of intersection of the ray entering the end of the image plane with the display, H' is a point of intersection of a perpendicular drawn from the intersection R to the optical axis with the optical axis, hr is a distance between the intersections R and H', and hm is a height from the optical axis to an apparatus frame on the opposite side of the intersection R with respect to the optical axis at a distance m from the intersection H' in the range of distance between the intersection H' and the eyepoint.

In an electronic view finder (EVF), such as a finder for video cameras or a still video finder, the reflection of incoming light, which can make an image hard to see, is due principally to the surfaces of the lens and the display. According to the present invention, in the EVF, the polarizing element is disposed closer to the eye than the LCD, so that incoming light and its reflected light can be made faint, without attenuating light forming the image to be observed, and the visibility of the image is improved.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
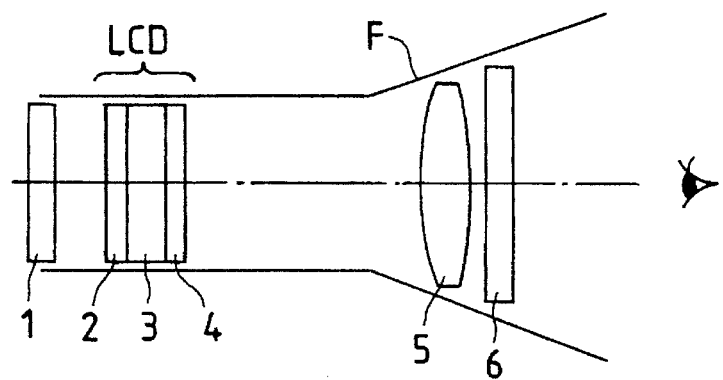
FIG. 1 is a side view showing an optical arrangement of a first embodiment of an image observing apparatus according to the present invention.

Referring to the drawings, the embodiments of the imaging observing apparatus according to the present invention will be explained in detail below.

FIG. 1 shows the first embodiment of the present invention. In this figure, reference symbol F represents an apparatus frame; numeral 1 a back light; 2 a polarizing plate; 3 a liquid crystal cell; 4 a polarizing plate; 5 a glass lens; and 6 a polarizing filter. In this case, the planes of polarization of the polarizing plates 2 and 4 and the polarizing filter 6 are arranged in the same direction, and a polarizing filter 6 possessing the following properties is used. Also, the polarizing plates 2 and 4 and the liquid crystal cell 3 constitute the LCD. The properties of filter 6 are:

| | |
|---|---|
| Single transmittance (T) | 43% |
| Parallel transmittance ($T_p$) | 81.8% |
| Orthogonal transmittance ($T_c$) | 4.2% |
| Degree of polarization | 95% |

As shown in FIG. 1, between the lens 5 as the optical system and the eye is disposed the polarizing filter 6 whose polarizing axis is oriented at the same angle as in the polarizing plate 4 on the eye side of the liquid crystal panel 3 constituting the LCD. In the conventional EVF, when an intensity of light entering the eye after incoming light incident from the eye side is reflected inside the EVF is denoted by R, an intensity of light leaving the LCD and entering the eye by S, a transmittance of the polarizing filter 6 by T, and a parallel transmittance (the transmittance of polarized light parallel to the polarizing axis) of the polarizing filter 6 by $T_p$, the incoming light is transmitted through the polarizing filter 6 twice, incidence on the EVF and emergence therefrom after internal reflection, so that its intensity N is expressed by $N = T \times T_p \times R$. Light emerging from the LCD, on the other hand, is already polarized and thus the intensity S after transmission through the polarizing filter 6 is given by $S = T_p \times I$, where I is the intensity of light of an image formed by the liquid crystal panel. Here, when an S/N ratio is taken, $S/N = (T_p \times I)/(T \times T_p \times R) = (1/T)(I/R)$, and since T<1, the S/N ratio is improved.

The incoming light is incident on the apparatus frame F from the eye side and is transmitted through the polarizing filter 6. After internal reflection, the light is again transmitted through the polarizing filter 6 and enters the eye. The light will thus be transmitted through the polarizing filter 6 twice, and the intensity of the light is reduced to 33.5%. On the other hand, light from the LCD also passes through the polarizing filter 6 to enter the eye, and the intensity of the light, unlike the conventional case (where no provision is made), decreases to 81.8%. Hence, if the S/N ratio in the conventional case is taken as 1, it will be seen that the S/N ratio in the first embodiment becomes 2.44 and is considerably improved. Also, in order to prevent the surface reflection of the polarizing filter 6, its surface is coated with an antireflection film.

The first embodiment, in which the polarizing filter is merely added to the EVF using the conventional LCD, can be carried out with great ease and at low cost.

Figure 2:
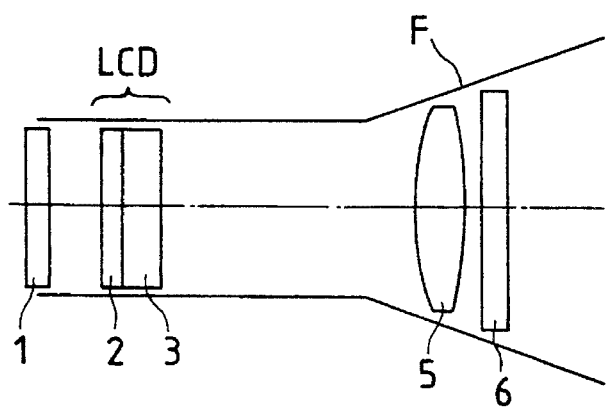
FIG. 2 is a side view showing a second embodiment of the present invention.

FIG. 2 shows the second embodiment of the present invention. This embodiment differs from the first embodiment in that the polarizing plate 4 is removed from the LCD. Specifically, the first embodiment has two polarizing elements whose polarizing axes are arranged in the same direction, sandwiching the lens 5 therebetween on the eye side of the liquid crystal panel 3. In order to view the image, however, one of them is only required and thus, as shown in FIG. 2, the polarizing plate 4 constituting the LCD on the eye side may be eliminated. The behavior of the polarizing plate 4 eliminated can be substituted by the polarizing filter 6 and, in this case, the intensity of light of the image becomes the intensity I as in FIG. 1. Here, the S/N ratio becomes $I/(T \times T_p \times R) = [1/(T \times T_p)](I/R)$, and since $T_p<1$, the S/N ratio is further improved. If the surface reflectance of the polarizing plate 2 is assumed to be identical with that of the liquid crystal cell 3, the intensity of reflected light by incoming light entering the eye is reduced to 33.5% as in the first embodiment. On the other hand, in view of light from the LCD, the polarizing plate on the eye side of the LCD where no provision is made is regarded as similar to that moved to the front of the lens. If the intensity is thought of as unchanged, the S/N ratio becomes 2.99, higher than that of the first embodiment.

In the second embodiment, not only can reflected light attributable to incoming light be reduced without impairing the brightness of the image, but the number of parts of the LCD can be diminished, with a resulting great effect. In order to avoid the influence of birefringence on the optical system, it is advisable that optical parts are constructed of materials, such as glass and acryl, which are difficult to produce birefringence. Further, where the incoming light, after being reflected once from the observer's face, is incident on the EVF, it becomes partially polarized light. Hence, the polarizing filter and the polarizing plate are arranged perpendicular to the direction of polarization of the light, thereby enabling the incoming light entering the eye to be reduced more effectively.

As stated above, when the polarizing element of the EVF is disposed closest to the eye, the incident light on the EVF and the resultant reflected light are made faint and the S/N ratio of the image is improved for good visibility.

Figure 3:
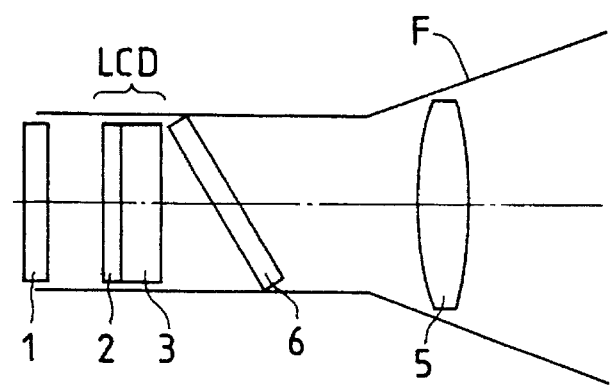
FIG. 3 is a side view showing a third embodiment of the present invention.

FIG. 3 shows the third embodiment of the present invention. This embodiment differs from the second embodiment in that the polarizing filter 6 is situated so that a normal line drawn to its surface makes an angle θ (nearly 45°) with the optical axis (see FIG. 4), and even when reflected at the surface, incoming light is prevented from entering the eye. Such an inclination of the polarizing element allows light reflected at the surface of the polarizing element, of the incoming light incident from the eye side, to strike against the wall of the apparatus frame F for absorption. Consequently, even where another polarizing element is added, the influence of the light on increased reflecting surfaces can be minimized. The surfaces situated on the rear (back light 1) side of the polarizing filter 6 have the same effect as in the second embodiment.

Figure 4:
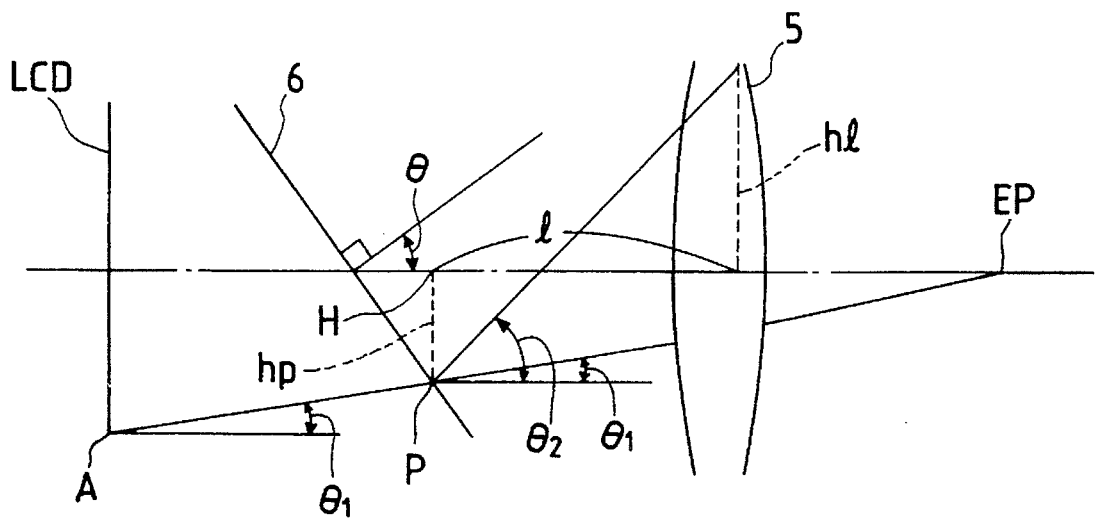
FIG. 4 is a view for explaining the condition of inclination of a polarizing filter and its behavior in the third embodiment.

The angle θ, as shown in FIG. 4, is selected to satisfy Condition (1). Thus, the light which emanates from an eyepoint EP, enters the finder, and is reflected at the surface of the polarizing plate 6 strikes the frame and is prevented from going out of the finder. Conversely, even when the incident incoming light is reflected at the surface of the polarizing plate 6, it does not enter the eye. The reflectance at the surface depends on the angle of incidence and varies with the direction of vibration of light. An s component vibrating parallel to the reflecting surface simply increases with increasing angle of incidence, while a p component vibrating in a plane including the normal line of the reflecting surface and the incident ray decreases for a time as the angle of incidence increase, and then reduces to zero when the angle of incidence becomes equal to $\tan^{-1} n$ (where n is the refractive index of the polarizing plate 6). After that, the p component simply increases, but in the range of the angle of incidence from 0° to 90°, s component≧p component. Further, by causing the transmission axis of the polarizing plate 6 to coincide with the direction of the p component, the transmittance of the p component of the inclined polarizing plate 6 is maximized in the neighborhood of the angle $\theta=\tan^{-1} n$ and, even though the coating is not applied, a sufficient transmittance can be secured. Since, at the same time, the transmittance of the incoming light containing the s component decreases as the angle θ increases, reflections by the reflecting surfaces lying on the LCD side of the polarizing plate 6 are impaired.

In the EVF, an optical member, such as a diffraction grating, is sometimes used to allow observations with higher magnification. The examples using such optical members are explained as the fourth, fifth, and sixth embodiments below.

Figure 5:
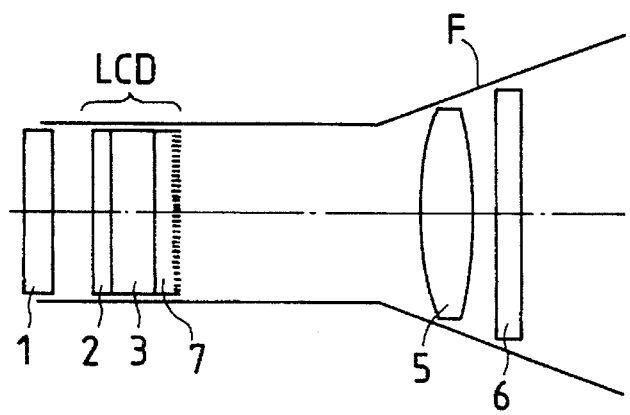
FIG. 5 is a side view showing a fourth embodiment of the present invention.

FIG. 5 shows the fourth embodiment of the present invention. This embodiment is different from the first embodiment in that, instead of the polarizing plate 4 in the LCD, a filter for cutting off frequency components corresponding to dot spaces of the image composed of dots (which is hereinafter referred to as a dot eraser filter) 7 is cemented to the liquid crystal cell 3. In this case, as in the second embodiment, the polarizing filter 6 is situated closest to the eye, and the influence of reflection on the surfaces of the optical members is reduced to about ⅓.

Figure 6:
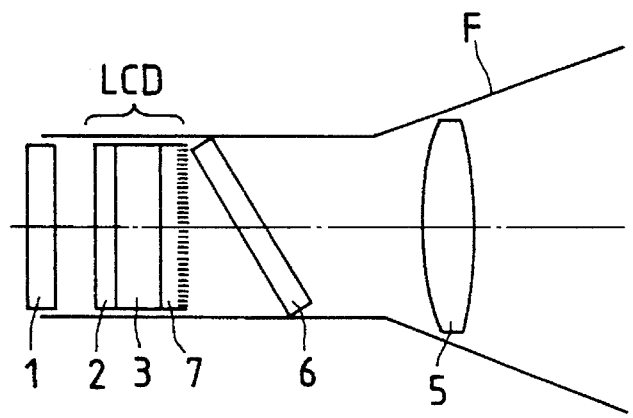
FIG. 6 is a side view showing a fifth embodiment of the present invention.

FIG. 6 depicts the fifth embodiment of the present invention. This embodiment is different from the fourth embodiment in that the polarizing filter 6 is inclined so that the normal line drawn to its surface makes the angle θ (nearly 45°) with the optical axis and even when incoming light is reflected at the surface, it fails to enter the eye. The advantage in this case is the same as in the third embodiment, and the condition of selecting the angle θ is also the same.

Figure 7:
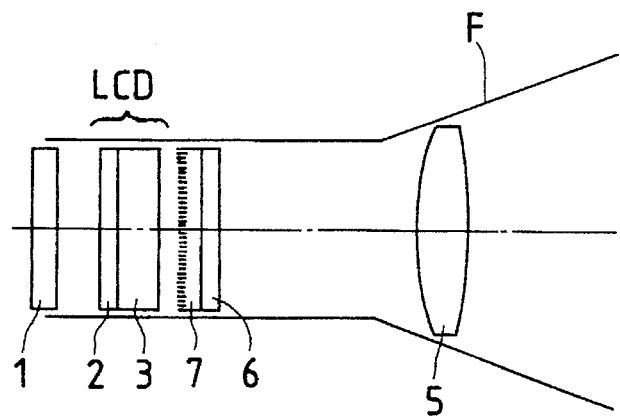
FIG. 7 is a side view showing a sixth embodiment of the present invention.

FIG. 7 shows the sixth embodiment of the present invention. This embodiment differs from the fifth embodiment in that the dot eraser filter 7 is separated from the liquid crystal cell 3 and cemented to the polarizing filter 6, being disposed between the LCD and the lens 5. In this case, the cementing makes it possible to decrease the number of air contact surfaces of the optical members and reduce the influence of reflection on the surfaces on the eye side of the liquid crystal cell 3 to ⅓.

Figure 8:
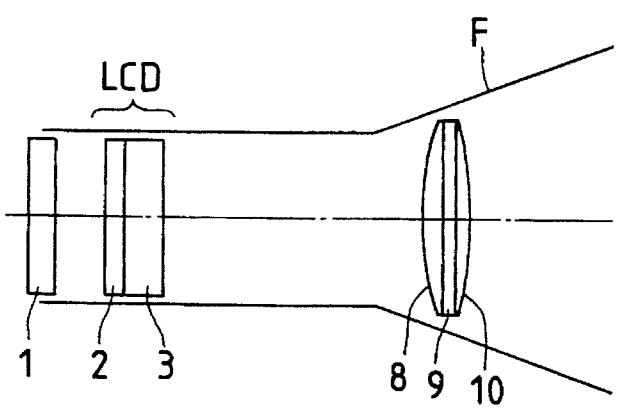
FIG. 8 is a side view showing a seventh embodiment of the present invention.

FIG. 8 shows the seventh embodiment of the present invention. This embodiment is different from the second embodiment in that, instead of the lens 5 and the polarizing filter 6, a plano-convex lens 8, a polarizing film 9, and a plano-convex lens 10 are cemented together. In this case, the influence of reflection on the surfaces of the lens 8 and the liquid crystal cell 3 can be reduced to ⅓. Cementing makes it possible to lessen the number of air contact surfaces. The polarizing film 9 is of very small thickness, and the cemented lens is configured to be equivalent to the lens 5 in the above embodiments.

Figure 9:
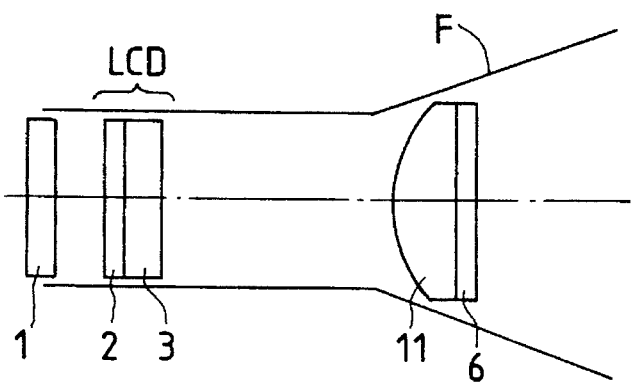
FIG. 9 is a side view showing an eighth embodiment of the present invention.

FIG. 9 depicts the eighth embodiment of the present invention. This embodiment is different from the seventh embodiment in that one of the surfaces of a lens 11 is configured as a flat surface, to which the polarizing filter 6 is cemented. In this case, as in the seventh embodiment, the influence of reflection on the lens and the optical member can be reduced to ⅓.

An example which takes account of reflection from electrodes lying inside the liquid crystal cell of the LCD is explained as the ninth embodiment below.

Figure 10:
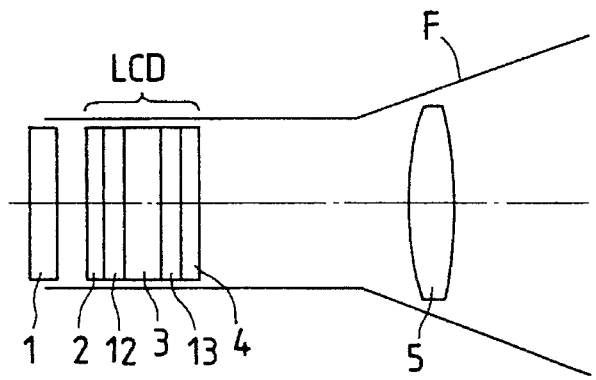
FIG. 10 is a side view showing a ninth embodiment of the present invention.

FIG. 10 shows the ninth embodiment of the present invention. This embodiment differs from any other embodiments mentioned above in that ¼ wave plates 12 and 13 are interposed, one on each side of the liquid crystal cell 3, between the polarizing plates 2 and 4 in the LCD, and the polarizing filter 6 is not used. In this case, light transmitted through the polarizing plate 4 and reflected between the ¼ wave plates 12 and 13 cannot virtually emerge from the polarizing plate 4 because its plane of vibration is rotated by 90°. Hence, the influence of reflection of light from electrodes lying inside the liquid crystal cell 3 can be minimized. The orientation of the polarizing axis of the polarizing plate is shifted by 45° from that of the axis of the ¼ wave plate. For the wave plate, a $(2n+1)\lambda/4$ plate (where n=0, 1, 2, 3 . . . and λ=wavelength of light) can be used, but a λ/4 plate is more favorable for the reduction of wavelength characteristics.

Specifically, as shown in FIG. 10, the LCD is constructed with the polarizing plate 2, the $(2n+1)\lambda/4$ plate 12, the liquid crystal cell 3, a $(2m+1)\lambda/4$ plate 13 (where m=0, 1, 2, 3, . . . ), and polarizing plate 4 which are arranged in the order from the side of light incidence toward the eye side. Then, reflected light, which is detrimental to image observation, from the surfaces situated on the eye side of the rear surface of the liquid crystal cell 3, of light incident from the eye side and transmitted through the polarizing plate 4, passes through the polarizing plate 13 twice. At this time, the plane of polarization of the light is rotated by 90°, so that most of the reflected light is absorbed by the polarizing plate 4. In this way, reflection made inside the liquid crystal cell 3 can also be diminished. On the other hand, light from the back light 1, after passing through the polarizing plate 2, becomes linearly polarized light and, after passing through the wave plate 12, changes to circularly polarized light. Subsequently, by traversing the wave plate 13, the light is restored to linearly polarized light to enter the polarizing plate 4. The image is thus obtained as in previous ways.

Figure 11:
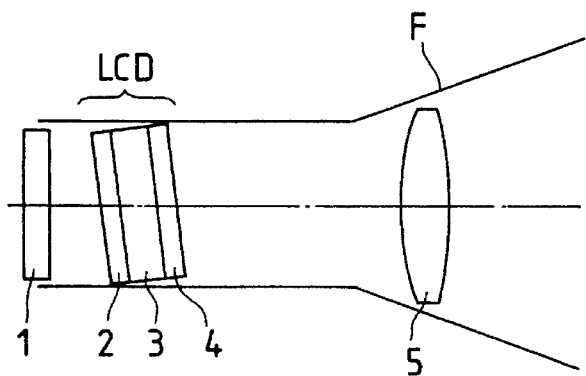
FIG. 11 is a side view showing a tenth embodiment of the present invention.
Figure 12:
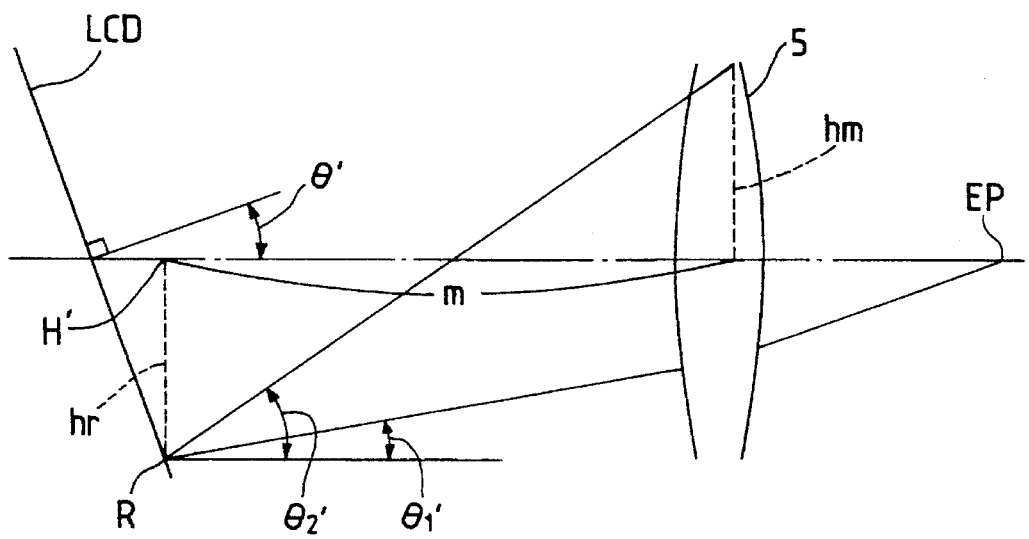
FIG. 12 is a view for explaining the condition of inclination of an image display and its behavior in the tenth embodiment.

FIG. 11 shows the tenth embodiment of the present invention. This embodiment is different from any other embodiments mentioned above in that the LCD is inclined so that the normal line drawn to its surface makes the angle θ' (nearly 20°) with the optical axis and, even when incoming light is reflected at the surface, it does not enter the eye. Further, as shown in FIG. 12, when the angle θ' satisfies Condition (2), light emanating from the eyepoint to enter the finder and reflected from the surface and interior of the image display strikes the frame and is prevented from going out of the finder. Conversely, even when the incident incoming light is reflected from the surface and interior of the image display, it does not enter the eye.

According to the tenth embodiment, the reflected light from the surface and interior of the LCD can be made not to enter the eye, without increasing the number of optical members. In this case, in order to lessen the effect of the inclination of the image plane on diopter shift, it is desirable that the value of the angle θ' is relatively small.

The numerical data of the lenses used in the above embodiments are shown below.

Lens 5

| | | | |
|---|---|---|---|
| $f_B = 41.00$ | | | |
| $R_1 = 32.72$ | $D_1 = 4.8$ | $n = 1.56384$ | $\nu = 60.69$ |
| $R_2 = -87.40$ (aspherical) | | | |
| $E = 0.115 \times 10^{-4}$ | | $F = -0.2457 \times 10^{-7}$ | |
| $G = -0.7378 \times 10^{-10}$ | | $H = 0.3220 \times 10^{-12}$ | |

Lens 8

| | | | |
|---|---|---|---|
| $f_B = 41.00$ | | | |
| $R_1 = 32.72$ | $D_1 = 3.0$ | $n = 1.56384$ | $\nu = 60.69$ |
| $R_2 = \infty$ | | | |

Lens 10

| | | | |
|---|---|---|---|
| $R_1 = \infty$ | $D_1 = 1.8$ | $n = 1.56384$ | $\nu = 60.69$ |
| $R_2 = -87.40$ (aspherical) | | | |
| $E = 0.115 \times 10^{-4}$ | | $F = -0.2457 \times 10^{-7}$ | |
| $G = -0.7378 \times 10^{-10}$ | | $H = 0.3220 \times 10^{-12}$ | |

Lens 11

| | | | |
|---|---|---|---|
| $f_B = 43.00$ | | | |
| $R_1 = 23.956$ (aspherical) | | | |
| | $D_1 = 5.0$ | $n = 1.56384$ | $\nu = 60.69$ |
| $E = 0.1298 \times 10^{-4}$ | | $F = -0.1049 \times 10^{-8}$ | |
| $G = 0.8035 \times 10^{-11}$ | | | |
| $R_2 = \infty$ | | | | where $f_B$ is the distance (F back) from the vertex of the lens on the LCD side to the liquid crystal cell (image plane), $R_1$ and $R_2$ are radii of curvature, $D_1$ is the thickness, n is the refractive index, ν is Abbe's number, and E, F, G, and H are aspherical coefficients.

A single lens is used in each embodiment, but instead, a lens system may be used. The lens (system) may well be moved back and forth to add a diopter compensating mechanism. Further, a mirror may also be inserted in the finder system to bend the optical path so that the entire apparatus can be compactly designed.

What is claimed is:

1. A finder comprising, in order from a side of incident light along an optical axis:

a liquid crystal display element including, in order along the optical axis:
a first polarizing element; and
a liquid crystal cell;

a lens unit that causes an image produced by said liquid crystal display element to enter an observer's eye; and a second polarizing element disposed between the observer's eye and said lens unit for reducing reflected light incident on said lens unit from a side of said lens unit opposite said liquid crystal display element.

2. A finder, comprising, in order along an optical axis:

a liquid crystal display element including, in order along the optical axis:
a first polarizing element;
a liquid crystal cell; and
a second polarizing element; and a lens unit for causing an image produced by said liquid crystal display element to enter an observer's eye;

wherein a third polarizing element is disposed on a side of said lens unit opposite said liquid crystal display element for reducing rays that are to be incident on said lens unit from the side of said lens unit opposite said liquid crystal display element.

3. A finder according to claims 1 or 2, wherein polarizers located first farthest and second farthest from a light incidence surface of said liquid crystal display element are disposed so that transmission axes thereof are substantially parallel to each other.

4. A finder according to one of claims 1 or 2, wherein said lens unit consists essentially of a single glass lens.

5. A finder comprising, in order along an optical axis:

a liquid crystal display element comprising, in order along the optical axis;
a first polarizing element;
a first wave plate;
a liquid crystal cell;
a second wave plate; and
a second polarizing element; and a lens unit for causing an image produced by said liquid crystal display element to enter an observer's eye;

wherein each of said first wave plate and said second wave plate is constructed so as to produce a phase difference of $(2n+1)\lambda/4$ between two components of a light wave transmitted therethrough polarized in respective directions parallel to a fast axis and a slow axis of said wave plates, said fast axis and said slow axis being perpendicular to each other, where n=0, 1, 2, 3, ... and λ represents a wavelength of said light wave.

6. A finder according to claim 5, wherein said first wave plate and said second wave plate are disposed so that directions of the fast axes thereof are one of parallel and perpendicular to each other and make an angle of 45° with a transmission axis of said first polarizing element.

7. A finder comprising, in order along an optical axis:

a back light;
a first polarizing element;
a liquid crystal cell;
a second polarizing element; and
a lens unit for causing an image to enter an observer's eye;

wherein said second polarizing element is obliquely disposed with respect to the optical axis with an angle θ made by a normal line drawn to a surface of said second polarizing element facing said lens unit with the optical axis satisfying a condition:

$(\theta_1+\theta_2)/2 < \theta < 85°$ where $\theta_1$ is an angle of incidence of a light ray entering an end of an image plane from an eyepoint in a plane including said normal line drawn to said surface of said second polarizing element and the optical axis, and $\theta_2$ is a minimum value of $\tan^{-1}$ (hp+hl)/1, where P is a point of intersection of the ray entering the end of the image plane with said second polarizing element, H is a point of intersection of a perpendicular drawn from the intersection P to the optical axis with the optical axis, hp is a distance between the intersections P and H, and hl is a height from the optical axis to an apparatus frame on an opposite side of the intersection P with respect to the optical axis at a distance l from the intersection H in a range of distance between the intersection H and the eyepoint, so as to prevent light rays incident on said second polarizing element from a side of said second polarizing element opposite said liquid crystal cell and reflected from said second polarizing element from entering the observer's eye via said lens unit.

8. A finder comprising, in order along an optical axis:
   a back light;
   a liquid crystal display element comprising, in order along the optical axis;
      a first polarizing element;
      a liquid crystal cell; and
      a second polarizing element;
   a lens unit for causing an image produced by said liquid crystal display element to enter an observer's eye;
   wherein said liquid crystal display element is obliquely disposed with respect to the optical axis with an angle θ' formed by a normal line drawn to a surface of said liquid crystal display element facing said lens unit with the optical axis satisfying a condition:

$$(\theta_1' + \theta_2')/2 < \theta'$$

where $\theta_1'$ is an angle of incidence of a light ray entering a point at an end of an image plane of said liquid crystal display element from an eyepoint in a plane including said normal line drawn to said surface of said liquid crystal display element and the optical axis, and $\theta_2'$ is a minimum value of $\tan^{-1}$ (hr+hm)/m, where R is the point at the end of the image plane of said liquid crystal display element, H' is a point of intersection of a perpendicular drawn from the point R to the optical axis with the optical axis, hr is a distance between the points R and H', and hm is a height from the optical axis to an apparatus frame on an opposite side of the point R with respect to the optical axis at a distance m from the intersection H' in a range of distance between the intersection H' and the eyepoint, so as to prevent light rays incident on said liquid crystal display element from a side of said liquid crystal display element on which said lens unit is disposed and reflected from said liquid crystal display element at least at one of said surface thereof facing said lens unit and interfaces disposed thereinside from entering the observer's eye via said lens unit.

* * * * *